United States Patent
Deguchi

(10) Patent No.: US 7,511,461 B2
(45) Date of Patent: Mar. 31, 2009

(54) SWITCHING REGULATOR CONTROL CIRCUIT WHICH PREVENTS SHOOT-THROUGH CURRENT IN A SYNCHRONOUS RECTIFIER

(75) Inventor: Michiyasu Deguchi, Chiba (JP)

(73) Assignee: Seiko Instruments Inc. (JP)

( * ) Notice: Subject to any disclaimer, the term of this patent is extended or adjusted under 35 U.S.C. 154(b) by 281 days.

(21) Appl. No.: 11/338,161

(22) Filed: Jan. 24, 2006

(65) Prior Publication Data
US 2006/0164056 A1    Jul. 27, 2006

(30) Foreign Application Priority Data
Jan. 26, 2005    (JP)    ............................ 2005-018349

(51) Int. Cl.
*G05F 1/62* (2006.01)
(52) U.S. Cl. ............. 323/259; 363/56.04; 323/284
(58) Field of Classification Search .......... 323/259, 323/284, 225, 222, 223; 363/56.04
See application file for complete search history.

(56) References Cited

U.S. PATENT DOCUMENTS

| | | | |
|---|---|---|---|
| 6,731,099 B2 * | 5/2004 | Inatomi et al. | 323/284 |
| 6,992,906 B1 * | 1/2006 | Herbert | 363/127 |
| 7,256,570 B2 * | 8/2007 | Zhou et al. | 323/224 |

* cited by examiner

*Primary Examiner*—Akm E Ullah
*Assistant Examiner*—Harry Behm
(74) *Attorney, Agent, or Firm*—Adams & Wilks

(57) ABSTRACT

In a maximum duty control state of a switching regulator control circuit, a period of time during which any one of a step-up switching circuit and a synchronous rectification switching circuit is always off is ensured, thereby preventing the switching efficiency from being remarkably deteriorated. In a maximum duty control state, a voltage difference is provided between a limiter voltage that is inputted to a comparator that controls the switching operation of the step-up switching circuit and a limiter voltage that is inputted to a comparator that controls the switching operation of the synchronous rectification switching circuit, to thereby ensure the period of time during which any one of the step-up switching circuit and the synchronous rectification switching circuit is always off.

5 Claims, 6 Drawing Sheets

SWITCHING REGULATOR CONTROL CIRCUIT WHICH PREVENTS SHOOT-THROUGH CURRENT IN A SYNCHRONOUS RECTIFIER

BACKGROUND OF THE INVENTION

1. Field of the Invention

The present invention relates to a switching regulator control circuit and a switching regulator using the circuit, and more particularly to a synchronous rectifier circuit in a step-up operation.

2. Description of the Related Art

FIG. 4 is a circuit diagram showing a conventional step-up/down switching regulator.

A comparator 12 compares a voltage Vd with a chopping wave to output a PWM driving signal. The voltage Vd is outputted from an error amplifier 11 having an inverting input terminal to which the voltage is inputted. The chopping wave is outputted from a chopping wave oscillator circuit 10 having a non-inverting input terminal to which the chopping wave is inputted. The output signal of the comparator 12 is supplied to a step-down switching circuit 24 through a buffer 21 as a step-down driving signal.

One non-inverting input terminal of a comparator 14 is inputted with a voltage Vu, which is obtained by shifting the output voltage Vd of the error amplifier 11 in level by Vos. Vos is set to a value equal to the amplitude voltage of the chopping wave so that the voltage Vu falls into the amplitude range of the chopping wave when the output voltage Vd of the error amplifier 11 exceeds an upper limit voltage of the chopping wave. An inverting input terminal of the comparator 14 is inputted with a chopping wave, and the chopping wave is compared with the voltage Vu to output a signal. The output signal from the comparator 14 is supplied to a step-up switching circuit 25 through a buffer 23 as a step-up driving signal.

One non-inverting input terminal of the comparator 13 is inputted with a voltage Vs, which is obtained by shifting the output voltage Vd of the error amplifier 11 in level by Vdt. An inverting input terminal of the comparator 13 is inputted with a chopping wave, and the chopping wave is compared with a voltage Vs to output a signal. The output signal from the comparator 13 is supplied to a synchronous rectification switching circuit 26 through a buffer 22 as a synchronous rectification driving signal.

Vdt is set to a value that is slightly smaller than Vos. As a result, the magnitude relation of Vs and Vu on the basis of the ground satisfies Vs>Vu, and the relation of the voltages including the chopping wave is as shown in FIG. 5. In this example, the step-up driving signal and the synchronous rectification driving signal are different from each other in duty ratio from the relation of the voltage Vs and the voltage Vu.

Accordingly, the step-up driving signal is supplied to the step-up switching circuit 25, which is turned on in response to an H level whereas the synchronous rectification driving signal is supplied to the synchronous rectification switching circuit 26, which is turned on in response to an L level, with the result that there exists a time Toff-off at which the step-up switching circuit 25 and the synchronous rectification switching circuit 26 are turned off at the same time.

The above time Toff-off prevents the output terminal and the ground from being short-circuited by turning on the step-up switching circuit 25 and the synchronous rectification switching circuit 26 at the same time. This is a technique essential to a switching regulator with synchronous rectification (for example, refer to JP 2003-180072 A).

Furthermore, in the switching regulator with the synchronous rectification, it is necessary to prevent the step-up switching circuit 25 and the synchronous rectification switching circuit 26 from always turning on when the output voltage drops and the voltage Vs and the voltage Vu are equal to or larger than the maximum Vclk(max) of the chopping wave.

In this example, each of the comparators 13 and 14 has two non-inverting input terminals, and one of those two non-inverting input terminals which inputs a lower potential is set to function whereas the other terminal which inputs a higher potential is not set to function. By using this feature, a voltage Vmax1 that is slightly lower than Vclk(max) is applied to the other non-inverting input terminals of the comparators 13 and 14. With the above structure, in the case where Vu and Vs exceed Vmax1, the comparison with the chopping wave becomes Vmax1. Accordingly, even in the case where a supply voltage is lowered, a PWM driving signal of a constant duty is outputted, which is capable of preventing the step-up switching circuit 25 and the synchronous rectification switching circuit 26 from always being turned on. Hereinafter, this state is called "maximum duty control state".

SUMMARY OF THE INVENTION

However, as shown in FIG. 5, when Vu and Vs exceed Vmax1, the output signals of the comparators 13 and 14 have a constant duty that is determined by the chopping wave and the Vmax1. Accordingly, the output signals of the comparators 13 and 14 have entirely the same duty, that is, the time Toff-off becomes 0, thereby making the switching efficiency remarkably low.

The present invention has been made in view of the above circumstances, and therefore an object of the present invention is to ensure a time Toff-off in the switching control of a step-up switching circuit and a synchronous rectification switching circuit, to thereby prevent the switching efficiency from being remarkably lowered.

To achieve the above object, according to the present invention, there is provided a switching regulator control circuit in which a third reference voltage Vmax2 obtained by adding a voltage Vos−Vdt to a second reference voltage Vmax1 is applied to one positive input terminal of a comparator 13, with the result that the comparator 13 controls the switching operation of a step-up switching circuit by using Vmax2, and a comparator 14 controls the switching operation of a synchronous rectification switching circuit by using Vmax1.

In the switching regulator control circuit according to the present invention, even in the maximum duty control state, the time Toff-off can be positively ensured in the switching control of the step-up switching control and the synchronous rectification switching circuit, thereby making it possible to prevent the switching efficiency from being remarkably deteriorated.

DETAILED DESCRIPTION OF THE PREFERRED EMBODIMENTS

Figure 1:
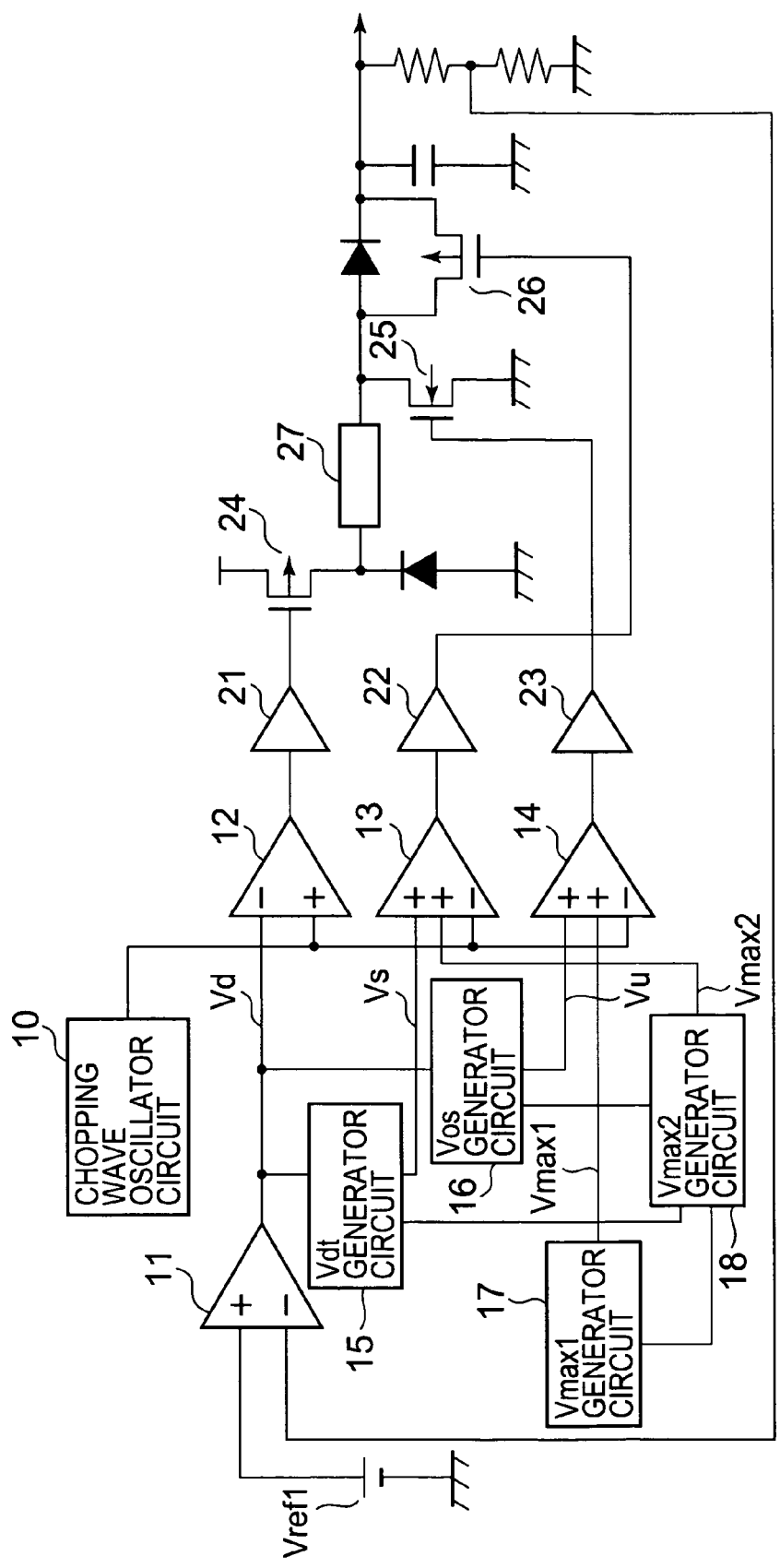
FIG. 1 is a block diagram showing a switching regulator control circuit according to the present invention.

FIG. 1 is a block diagram showing a switching regulator control circuit according to the present invention. A switching regulator control circuit according to the present invention includes an error amplifier circuit 11 for comparing a divided voltage of an output voltage with a reference voltage Vref1 to output a voltage Vd, a chopping wave oscillator circuit 10, a Vdt generator circuit 15, which is a first constant voltage source, a Vos generator circuit 16, which is a second constant voltage source, a Vmax1 generator circuit 17, which is a second reference voltage source, a Vmax2 generator circuit 18, which is a third reference voltage source, and comparators 12, 13, and 14 for comparing voltages outputted from those circuits with one another. The respective input terminals of the comparators 12 and 14 are inputted with the same signals as those in the conventional switching regulator control circuit, and the other non-inverting input terminal of the comparator 13 is inputted with a voltage Vmax2 that is outputted by the Vmax2 generator circuit.

In the above switching regulator control circuit, the Vmax2 generator circuit generates a voltage that is higher than an output voltage Vmax1 of the Vmax1 generator circuit by Vos−Vdt. With such a structure, in the case where Vu exceeds Vmax1, control can be conducted so that Vs exceeds Vmax2.

Figure 3:
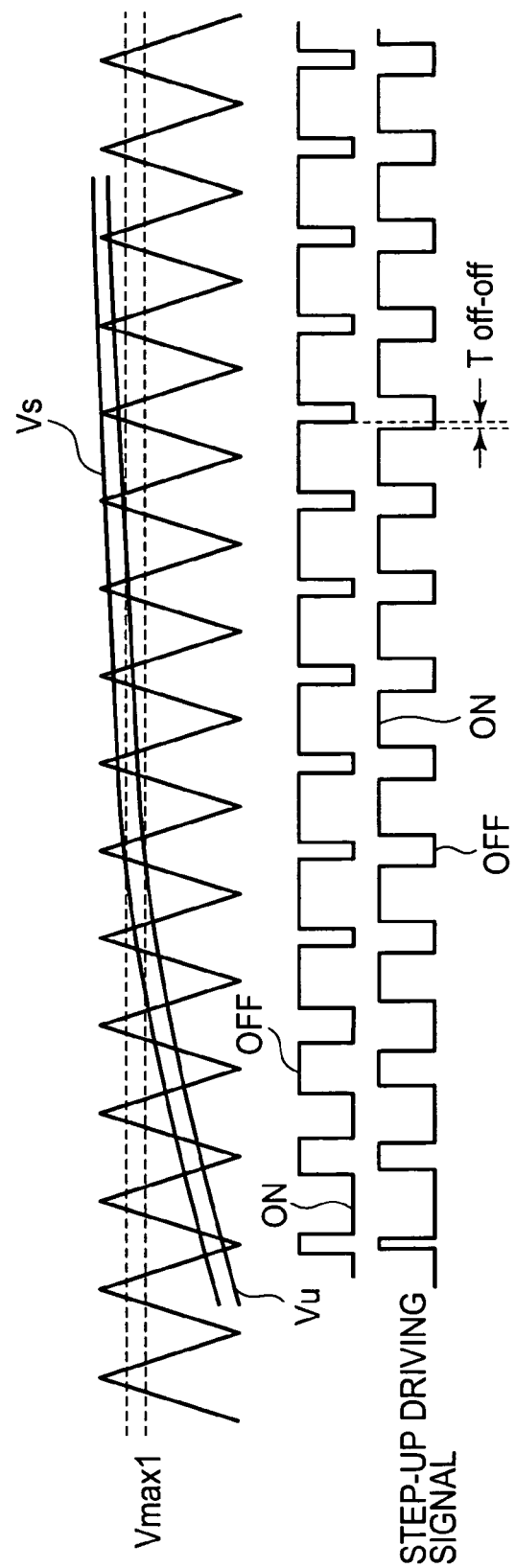
FIG. 3 is a timing chart of the switching regulator control circuit according to the present invention.
Figure 4:
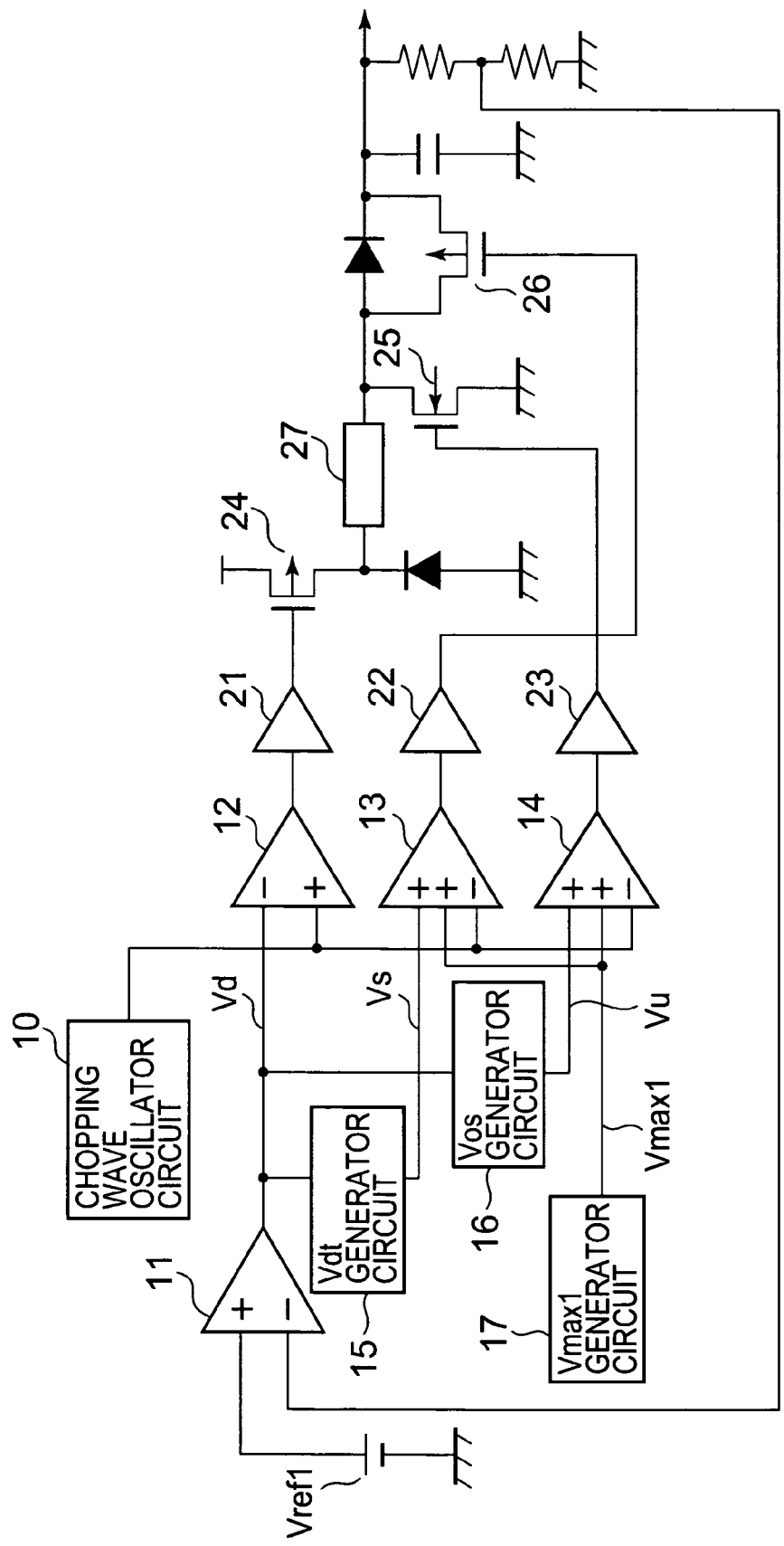
FIG. 4 is a block diagram showing a conventional switching regulator control circuit.
Figure 5:
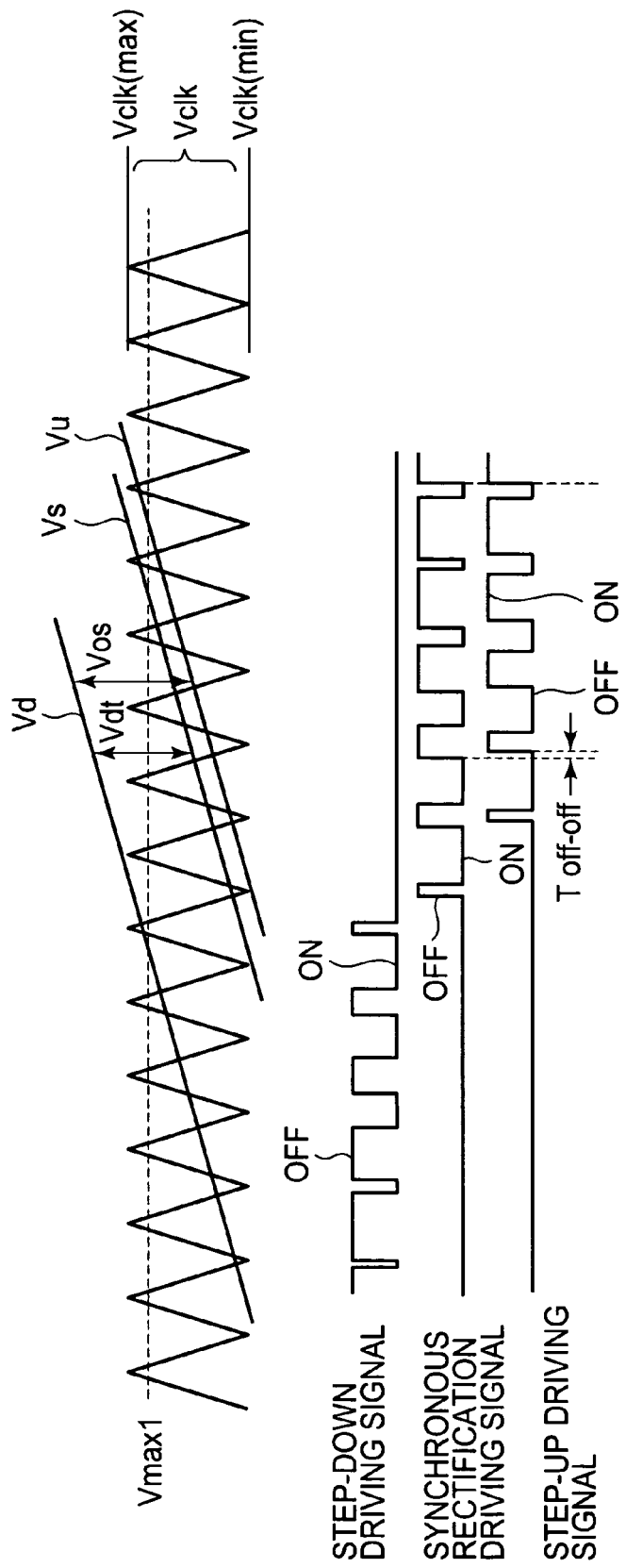
FIG. 5 is a timing chart of a conventional switching regulator control circuit.

Accordingly, as shown in FIG. 3, even in the case where the voltage Vs and the voltage Vu are equal to or larger than a maximum value Vclk(max) of the chopping waves, a relationship between a step-up switching circuit 25 and a synchronous rectification switching circuit 26 can be so controlled as to always ensure a time Toff-off.

Figure 2:
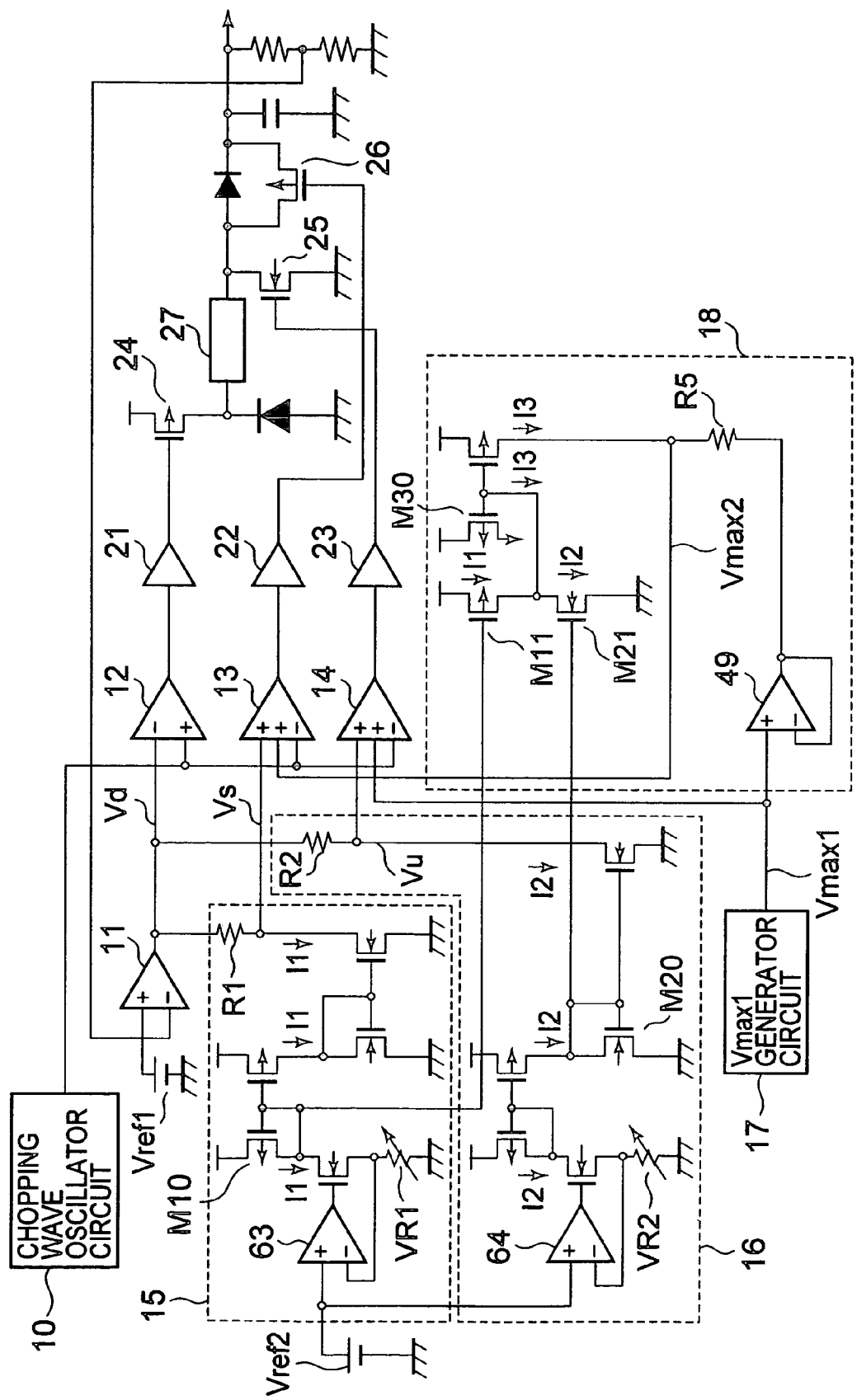
FIG. 2 is a circuit diagram showing the switching regulator control circuit according to the present invention.

FIG. 2 is a circuit diagram showing the switching regulator control circuit according to the present invention. FIG. 2 shows an example of the Vdt generator circuit 15, the Vos generator circuit 16, and the Vmax2 generator circuit 18 shown in the block diagram of FIG. 1 in detail.

In the Vdt generator circuit 15, a constant current I1 that is determined by a variable resistor VR1 is transmitted as a constant current that flows in a resistor R1 through a current mirror circuit. In the Vos generator circuit 16, a constant current I2 that is determined by a variable resistor VR2 is transmitted as a constant current that flows in a resistor R2 through a current mirror circuit. The resistors R1 and R2 are fixed resistors that are connected to an output of the error amplifier 11, and resistances of those resistors R1 and R2 are set to be equal to each other. Accordingly, potential differences that develop between both ends of the resistors R1 and R2 are determined by the constant currents I1 and I2. In this manner, signals Vs and Vu, which are shifted in level by a certain constant value can be obtained from the resistor R1 and the output Vd of the error amplifier 11. Vos−Vdt means a current difference between the constant current I1 and the constant current I2. Accordingly, the constant current I1 and the constant current I2 are copied by using the current mirror circuits of transistors M10 and M11, and M20 and M21. Also, the transistors M11 and M21 are connected in series, and a transistor M30 and the transistor M11 that operate as constant current elements with connection of the gate electrode and the drain electrode are arranged in parallel. With such a structure, a current I3 (=I1−I2) which is equal to a difference between the constant current I2 and the constant current I1 flows in the transistor M30. The current I3 is allowed to flow in a resistor RS that is equal to the resistors R1 and R2, thereby making it possible to obtain a potential difference that is equal to Vos−Vdt.

Since the output voltage Vmax1 is developed by dividing the reference voltage by the resistor, impedance conversion is conducted by using a potential follower 49.

The output voltage Vmax2 thus obtained is inputted to another non-inverting input terminal of the comparator 13, thereby making it possible to ensure the time Toff-off even in the maximum duty control state in the switching control of the step-up switching circuit 25 and the synchronous rectification switching circuit 26.

Figure 6:
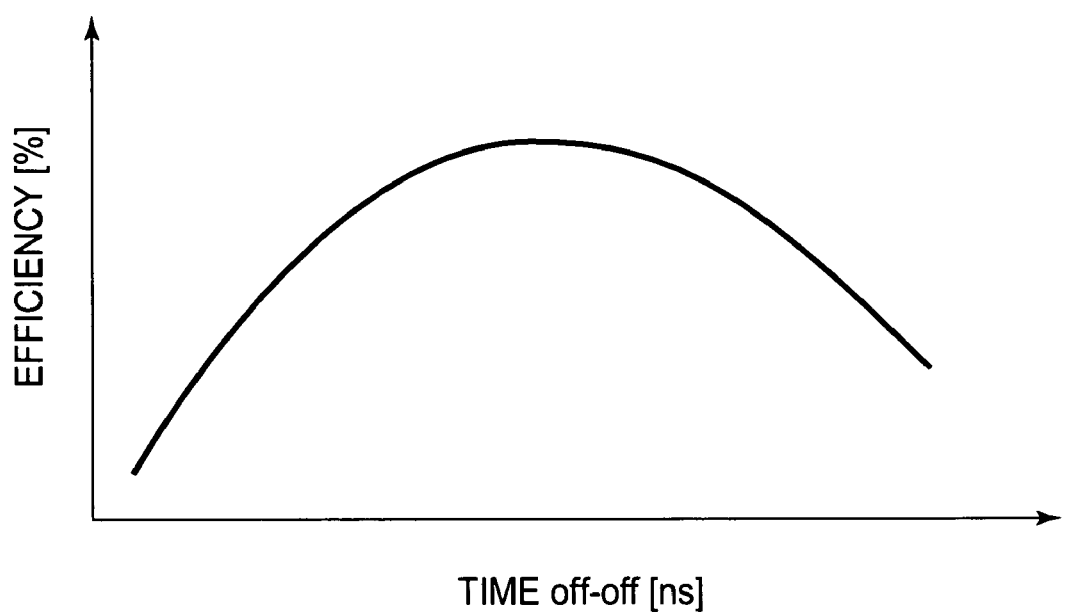
FIG. 6 is a graph showing a relation between a time Toff-off and power conversion efficiency.

FIG. 6 is a graph showing a relation between a time Toff-off and power conversion efficiency. The voltage Vos−Vdt is so set as to enhance the time Toff-off to power conversion efficiency, thereby making it possible to obtain the stable step-up operation of the switching regulator.

DESCRIPTION OF REFERENCE NUMERALS 10 chopping wave oscillator circuit
15 Vdt generator circuit
16 Vos generator circuit
17 Vmax1 generator circuit
18 Vmax2 generator circuit

What is claimed is:

1. A switching regulator control circuit, comprising:
   a first reference voltage generator circuit;
   a second reference voltage generator circuit;
   a third reference voltage generator circuit;
   a dividing resistor for dividing an output voltage of the switching regulator;
   a chopping wave generator circuit;
   an error amplifier for inputting a voltage of the first reference voltage generator circuit and a voltage divided by the dividing resistor;
   a first comparator for receiving a voltage obtained by dropping an output of the error amplifier by a voltage of a first constant voltage source, a voltage of the third reference voltage generator circuit, and a voltage of the chopping wave generator circuit;
   a second comparator for receiving a voltage obtained by dropping an output of the error amplifier by a voltage of a second constant voltage source, a voltage of the second reference voltage generator circuit, and the voltage of the chopping wave generator circuit;
   a synchronous rectification switching circuit that is controlled based on an output of the first comparator; and
   a step-up switching circuit that is controlled based on an output of the second comparator.

2. The switching regulator control circuit according to claim 1, wherein the voltage of the second reference voltage generator circuit and the voltage of the third reference voltage generator circuit are lower than a maximum voltage of the chopping wave generator circuit, and one of the step-up switching circuit and the synchronous rectification switching circuit is always off even when the output voltage of the switching regulator drops.

3. The switching regulator control circuit according to claim 1, wherein the voltage of the third reference voltage generator circuit is a voltage obtained by adding a difference between the voltage of the first constant voltage source and the voltage of the second constant voltage source to the voltage of the second reference voltage generator circuit.

4. The switching regulator control circuit according to claim 1, wherein there is provided a period of time during which the synchronous rectification switching circuit and the step-up switching circuit are off at the same time.

5. A switching regulator comprising the switching regulator control circuit according to claim 1.

* * * * *